United States Patent
Carmichael

(10) Patent No.: US 7,619,984 B2
(45) Date of Patent: Nov. 17, 2009

(54) MECHANISM FOR ERROR HANDLING OF CORRUPTED REPEATING PRIMITIVES DURING FRAME RECEPTION

(75) Inventor: Richard D. Carmichael, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 729 days.

(21) Appl. No.: 11/215,894

(22) Filed: Aug. 30, 2005

(65) Prior Publication Data

US 2007/0061681 A1 Mar. 15, 2007

(51) Int. Cl.
*H04L 12/26* (2006.01)
*H04J 3/00* (2006.01)
*H04J 3/07* (2006.01)
*G06F 11/00* (2006.01)
*H03M 13/00* (2006.01)

(52) U.S. Cl. .............. 370/252; 370/476; 370/506; 714/47; 714/49; 714/756

(58) Field of Classification Search ........... 370/241, 370/242, 247–249, 252, 251, 476, 506; 714/752–780, 714/1, 2, 47, 48, 49, 50, 51, 52, 53, 54, 55, 714/56

See application file for complete search history.

(56) References Cited

U.S. PATENT DOCUMENTS

| | | | |
|---|---|---|---|
| 6,226,269 B1* | 5/2001 | Brewer et al. ............ 370/245 |
| 6,380,873 B1* | 4/2002 | Priborsky et al. .......... 341/87 |
| 6,618,815 B1* | 9/2003 | Atkins et al. ............. 713/400 |
| 6,985,983 B2* | 1/2006 | Pellegrino et al. ......... 710/200 |
| 7,171,525 B1* | 1/2007 | Norman et al. ........... 711/150 |
| 7,200,108 B2* | 4/2007 | Beer et al. ............... 370/222 |
| 7,275,103 B1* | 9/2007 | Thrasher et al. .......... 709/224 |
| 7,360,119 B1* | 4/2008 | Stenfort et al. ............ 714/43 |
| 7,366,958 B2* | 4/2008 | Marushak et al. .......... 714/43 |
| 7,404,013 B1* | 7/2008 | Masiewicz ................ 710/5 |
| 7,406,652 B2* | 7/2008 | Tseng et al. ............. 714/798 |
| 2001/0002901 A1* | 6/2001 | Henson ................... 370/242 |
| 2003/0074449 A1* | 4/2003 | Smith et al. ............. 709/226 |
| 2003/0198189 A1* | 10/2003 | Roberts et al. ........... 370/252 |
| 2003/0237038 A1* | 12/2003 | Cole et al. ............... 714/755 |
| 2004/0100944 A1* | 5/2004 | Richmond et al. ......... 370/360 |
| 2005/0036451 A1* | 2/2005 | Green .................... 370/242 |
| 2006/0107089 A1* | 5/2006 | Jansz et al. ............... 714/5 |

OTHER PUBLICATIONS

U.S. Appl. No. 10/972,841, filed Oct. 25, 2004, Carmichael.

* cited by examiner

*Primary Examiner*—Seema S Rao
*Assistant Examiner*—Xavier Wong
(74) *Attorney, Agent, or Firm*—Christopher K. Gagne

(57) ABSTRACT

A method for error handling of corrupted repeating primitives during frame reception is disclosed. The method comprises identifying a portion of a received frame including a repeating primitive sequence, determining whether data in the repeating primitive sequence has one or more errors, and indicating a successful reception of the received frame with the one or more errors in the repeating primitive sequence if the number of errors is less than a determined threshold. Other embodiments are also disclosed.

22 Claims, 4 Drawing Sheets

MECHANISM FOR ERROR HANDLING OF CORRUPTED REPEATING PRIMITIVES DURING FRAME RECEPTION

FIELD OF THE INVENTION

The present invention relates to computer systems; more particularly, the present invention relates to error handling of corrupted repeating primitives during frame reception.

BACKGROUND

Serial attached storage protocols, such as serial ATA (SATA) and serial SCSI (SAS) are becoming more prevalent for connecting hard drives to a computer system. When connecting hard drives through the SATA or SAS protocols, the I/O interface potential bandwidth may exceed that of the target device media. Therefore, when communicating using these protocols there may be time periods when data is not being sent. At these moments, the SATA and SAS protocols implement a continued repeating primitive sequence of data. For example, a 'HOLD' primitive may be repeatedly sent to indicate there is no data on the line.

In practice, the protocol engine for the SATA and SAS protocols generates long sequences of the same primitive repeating. However, such repeated signals can create electromagnetic interference (EMI) problems. To address this problem, the SATA and SAS specifications define a 'continue' primitive that indicates random data received prior to the next primitive will be ignored. The protocol engine transmits this randomized "junk" data to minimize EMI during these repeating primitive sequences.

Unlike previous serial interfaces, such a Fibre Channel, the SATA and SAS interfaces are low cost and implemented using inexpensive connectors, oscillators, and transmission lines. Therefore, the probability of receiving corrupted data and primitives is high. Many times errors occur during the transmission of the randomized "junk" data in a continued repeating primitive. When these errors are encountered, current designs indicate the errors to firmware via interrupts, and require retransmission of multiple frames. This process occurs even when a single repeating primitive data double word inside a single frame is in error.

The overhead created by this error condition procedure is high because it requires one or more of a context switch, determination of the invalid I/O device, requesting the target device to retransmit, and the actual retransmittal of the frame information structure (FIS) which is typically more than one frame. This is a relatively common occurrence that degrades system performance. Therefore, a method to validate received frames that have embedded, corrupted data inside continued repeating primitive sequences, without requiring firmware intervention would be beneficial.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for error handling of corrupted repeating primitives during frame reception is described. In the following detailed description of the invention numerous specific details are set forth in order to provide a thorough understanding of the present invention. However, it will be apparent to one skilled in the art that the invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
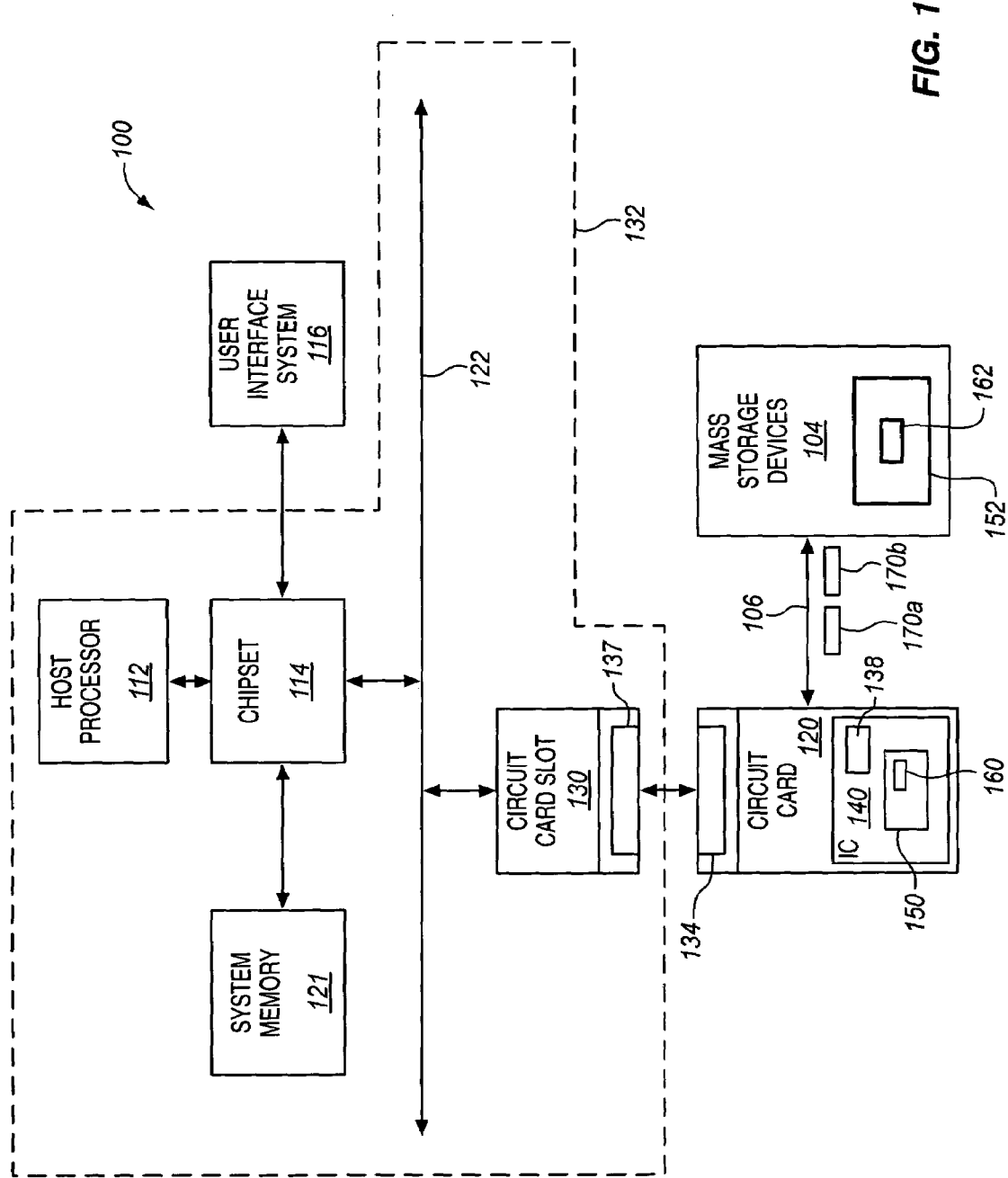
FIG. 1 is a block diagram of one embodiment of a computer system.

FIG. 1 illustrates a system 100 consistent with an embodiment including a host bus adapter (HBA), e.g., circuit card 120. The circuit card 120 may be capable of bidirectional communication protocols. Mass storage 104 may include one or more mass storage devices, e.g., one or more redundant array of independent disks (RAID) and/or peripheral devices.

Communication between circuit card 120 and mass storage 104 may take place by transmission of one or more frames. As used herein in any embodiment, a "frame" may comprise one or more symbols and/or values. Both the circuit card 120 and mass storage 104 may act as a receiving device that receives data and/or commands from the other. The circuit card 120 may have an integrated circuit 140 having frame validation circuitry 160 capable of performing frame validation checks on received frames. As used herein, an "integrated circuit" means a semiconductor device and/or microelectronic device, such as, for example, singly or in any combination, hardwired circuitry, programmable circuitry, state machine circuitry, and/or firmware that stores instructions executed by programmable circuitry.

The system 100 may also generally include a host processor 112, a bus 122, a user interface system 116, a chipset 114, system memory 121, a circuit card slot 130, and a circuit card 120 capable of communicating with mass storage 104. The host processor 112 may include one or more processors known in the art such as an Intel® Pentium® IV processor and/or an XScale® architecture processor commercially available from Intel Corporation® of Santa Clara, Calif. The bus 122 may include various bus types to transfer data and commands. For instance, the bus 122 may comply with the Peripheral Component Interconnect Express (PCIe) Base Specification Revision 1.0, published Jul. 22, 2002. The bus 122 may alternatively compel with the PCI-X Specification Rev. 1.0a, Jul. 24, 2000.

The user interface system 116 may include one or more devices for a human user to input commands and/or data and/or to monitor the system 100 such as, for example, a keyboard, pointing device, and/or video display. The chipset 114 may include a host bridge/hub system (not shown) that couples the processor 112, system memory 121, and user interface system 116 to each other and to the bus 122. Chipset 114 may include one or more integrated circuit chips. The chipset 114 and processor 112 may be coupled through an XSI interface. The XSI interface may include a 64-bit, high-performance bus designed to interconnect to XScale® architecture processors. The processor 112, system memory 121, chipset 114, bus 122, and circuit card slot 130 may be on one circuit board 132 such as a system motherboard.

The circuit card 120 may be constructed to permit it to be inserted into the circuit card slot 130. When the circuit card 120 is properly inserted into the slot 130, connectors 134 and 137 become electrically and mechanically coupled to each other. When connectors 134 and 137 are so coupled to each other, the card 120 becomes electrically coupled to the bus 122 and may exchange data and/or commands with system memory 121, host processor 112, and/or user interface system 116 via bus 122 and chipset 114.

Alternatively, without departing from this embodiment, the operative circuitry of the circuit card 120 may be included in other structures, systems, and/or devices. These other structures, systems, and/or devices may be, for example, in the motherboard 132, and coupled to the bus 122. These other structures, systems, and/or devices may also be, for example, comprised in the chipset 114.

The circuit card 120 may communicate with mass storage 104 via one or more communication links 106 using one or more communication protocols. Exemplary communication protocols may include Fibre Channel (FC), Serial Advanced Technology Attachment (SATA), and/or Serial Attached Small Computer Systems Interface (SAS) protocol. If a FC protocol is used by circuit card 120 to exchange data and/or commands with mass storage 104, it may comply or be compatible with the interface/protocol described in ANSI Standard Fibre Channel Framing and Signaling Interface Specification, 2 Rev 0.3 T11/1619-D, dated Sep. 7, 2004. Alternatively, if a SATA protocol is used by circuit card 120 to exchange data and/or commands with mass storage 104, it may comply or be compatible with the protocol described in "Serial ATA: High Speed Serialized AT Attachment," Revision 1.0a, published on Jan. 7, 2003 by Serial ATA working Group, and the Extension to SATA, 1.0a Rev 1.2, dated Aug. 27, 2004. Further alternatively, if a SAS protocol is used by circuit card 120 to exchange data and/or command with mass storage 104, it may comply or be compatible with the protocol described in "Information Technology·Serial Attached SCSI-1.1 (SAS)", Working Draft American National Standard of International Committee For Information Technology Standards (INCITS) T10 Technical Committee, Project T10/1562-D, Revision 6, published Oct. 2, 2004, by American National Standards Institute (hereinafter termed the "SAS Standard") and/or later-published versions of SAS Standard.

To accomplish such communication using any variety of communication protocols such as SAS, SATA, and FC protocols, the circuit card 120 may have protocol engine circuitry 150. The protocol engine circuitry 150 may exchange data and commands with mass storage 104 by transmission and reception of one or more frames, e.g., frames 170a, 170b. A large number of frames from many different devices such as mass storage devices and HBAs may be transmitted via communication links 106. The protocol engine circuitry 150 may be included in the integrated circuit 140. The protocol engine circuitry 150 may include various layers such as a transport layer circuitry. Such transport layer circuitry may support Serial Advanced Technology Attachment (SATA) Tunneling Protocol (STP) layer circuitry.

The integrated circuit 140 may also comprise memory 138. Memory 138 may comprise one or more of the following types of memories: semiconductor firmware memory, programmable memory, non-volatile memory, read only memory, electrically programmable memory, random access memory, flash memory, magnetic disk memory, and/or optical disk memory.

Machine readable firmware program instructions may be stored in memory 138. These instructions may be accessed and executed by the integrated circuit 140. When executed by the integrated circuit 140, these instructions may result in the integrated circuit 140 performing the operating described herein as being performed by the integrated circuit.

The IC 140 may comprise frame validation circuitry 160 to validate received frames, e.g., frames 170a, 170b. Mass storage 104 may also include frame validation circuitry 162 operable to validate received frames. Such frame validation circuitry 160, 162 may be included in the protocol engine circuitry 150, 152 as illustrated in FIG. 1, or alternatively, may be stand alone circuitry or included in other circuitry.

Figure 2:
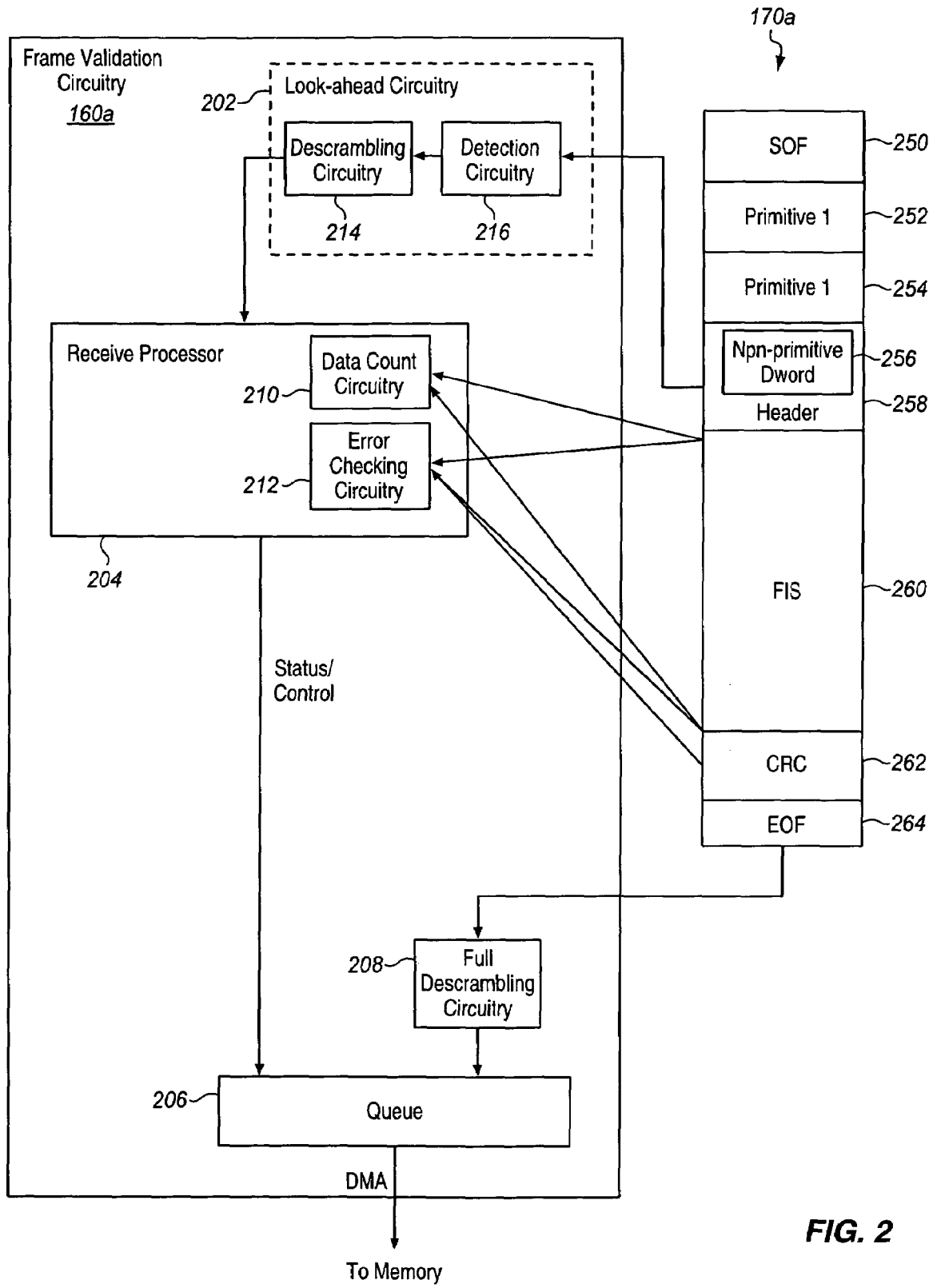
FIG. 2 illustrates one embodiment of an integrated circuit.

FIG. 2 illustrates one embodiment 160a of the frame validation circuitry 160 comprised in the protocol engine circuitry 150 of the IC 140 of FIG. 1 to receive and process a received frame 170a. A plurality of received frames may be received via communication link 106. The frame may be of a variety of formats depending, at least in part, on the communication protocol utilized. An exemplary SATA compliant frame 170a is illustrated. The SATA-compliant frame may include a start of frame (SOF) primitive 250 to indicate the start of a frame 170a.

A "primitive" as used herein may be defined as a group of one or more symbols, for example, representing control data to facilitate control of the transfer of information and/or to provide real-time status information. One or more primitives 252 and 254, e.g., an ALIGN primitive, may follow the SOF primitive 250. In some embodiments, a sequence of continued repeating primitives may follow the SOF primitive 205.

A frame header 258 may follow the SOF primitive 250 (again with other allowed primitive 252 and 254 perhaps dispersed there between). The frame header 258 may include a first non-primitive double word (Dword) 256 occurring after the SOF primitive 250. This Dword 256 may contain scrambled data. As used herein, a Dword may contain four bytes or thirty-two bits of data. This first non-primitive Dword 256 may include data indicating the type of frame information structure (FIS) 260 and expected length of the FIS 260, e.g., the first four bytes of this first non-primitive Dword 256 may be representative of the FIS type, expected length of the FIS 260, and other FIS attributes such as an error field for direct memory access (DMA) setup.

The FIS 260 may follow the frame header 258. This FIS data may also be scrambled. As used herein, the "FIS" may be defined as a portion of the frame that comprises payload. The length of the FIS 260 may be based on the specified FIS type as may be detailed in the first non-primitive Dword 256. An error checking code may follow the FIS 260. An error checking code may include a cyclic redundancy check (CRC) 262 to help facilitate checking of the validity of the received data in the FIS 258. Finally, an end of frame (EOF) primitive 264 may follow the CRC 262 to mark the end of the frame 170a.

In general, the frame validation circuitry 160a may include "look-ahead" circuitry 202, a receive processor 204, an output queue 206, and descrambling circuitry 208. Look-ahead circuitry 202 may further include descrambling circuitry 214 and detection circuitry 216. Although the look-ahead circuitry 202 is described herein relative to the frame validation circuitry 160a, the look-up circuitry may also be utilized for other functions, e.g., to quickly determine whether or not a potential SAS command queuing interlock potential exists.

The receive processor 204 of the frame validation circuitry 160a may include various logic and state machines to perform a variety of functions. The receive processor 204 may further include data count circuitry 210 and error checking circuitry 212.

Figure 3:
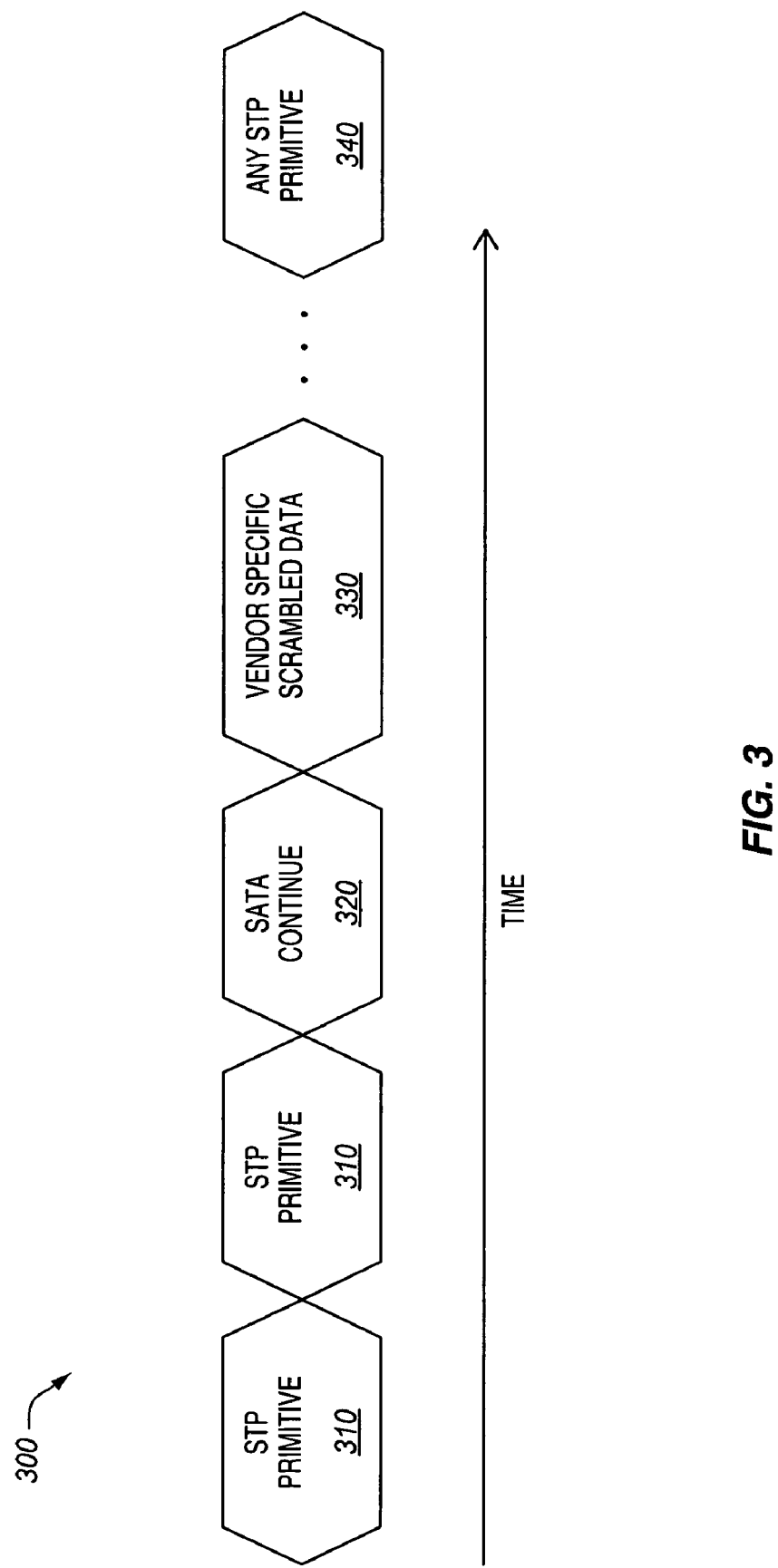
FIG. 3 illustrates one embodiment of a continued repeating primitive sequence.

FIG. 3 illustrates a block diagram of one embodiment of a continued repeating primitive sequence. In one embodiment, continued repeating primitive sequence 300 may be a received frame 170*a* at frame validation circuitry 160, 160*a*, as described with respect to FIGS. 1 and 2. Continued repeating primitive sequence 300 includes two repeating primitives 310, e.g., STP primitives. In one embodiment, these repeating primitives may be a 'HOLD' command.

The repeating primitives 310 are followed by a 'continue' primitive 320, such as a SATA 'continue' primitive, that informs the receiver that random data received prior to the next primitive should be ignored as "junk" data. The 'continue' primitive 320 is followed by the "junk" data 330 which, in one embodiment, is vendor-specific scrambled data. The receiver will stop ignoring the random "junk" data 330 once it receives the next primitive 340, such as another STP primitive.

In many cases, the "junk" data 330 will include errors and corrupted data. In general, frame validation logic determines frame boundaries, descrambles primitive and user data, checks for valid CRC, and checks for allowable sequences of primitives and data. Ultimately, frames are formatted as "start of frame status", user data, and "end of frame completion status" for DMA to pre-allocated memory. When error conditions are encountered, these formatted frames are similar, but include abbreviated data and end of frame error flags that describe the specific conditions detected during reception of a given FIS.

When inside of a FIS, frame validation logic checks for valid data characters, valid primitives, proper Dword synchronization, and valid 10b/8b disparity on each Dword receive cycle. If any of the above checks indicate an error, or if invalid SATA/SAS/STP sequences are detected during repeating primitive sequence conditions, the FIS is abbreviated, formatted with the error information, and sent to memory via DMA.

In one embodiment of the invention, frame validation logic may allow errors to occur in the continued repeating primitive sequences. This allowance reduces overhead associated with the typical error condition response protocol. A frame with an error condition may be received without frame abbreviation and error flags, if the following conditions apply:

(1) Low level errors such as invalid data characters, improper Dword synchronization, and invalid 10b/8b disparity are restored before conclusion of the repeating primitive sequence. This assumes that solely data Dwords were transmitted with error conditions;

(2) The error condition detected did not involve a Dword that included a probable corrupted primitive control "K" character;

(3) Integrity of the FIS was not compromised by the errors detected. In other words, primitive and data sequences were within the criteria specified by the communication protocol; and (4) Data CRC comparison was successful for the entire FIS. If all of the above conditions apply, frame validation circuitry indicates a "good frame" to firmware and appends "good" error status of "zero" to the formatted frame. The receiver then indicates successful frame reception to a link controller. However, if any of the above error conditions occur, and firmware intervention is needed, the receiver appends "non-zero" error status to the formatted frame, and indicates bad frame reception status to the link controller. During bad frame conditions, firmware then requests retransmission of data by the target device.

Figure 4:
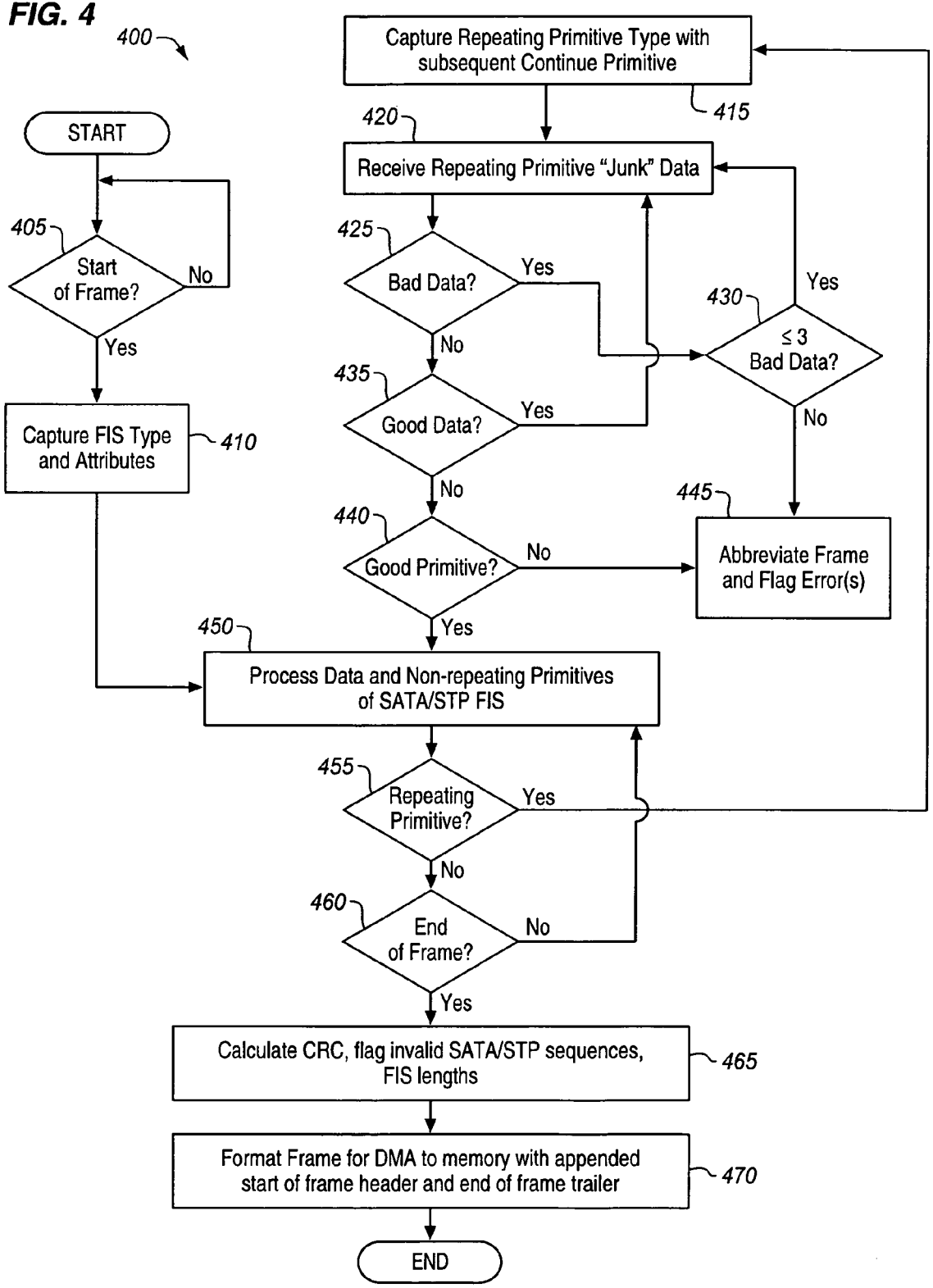
FIG. 4 is a flow chart illustrating a method of one embodiment of the invention.

FIG. 4 is a flow diagram illustrating one embodiment of a method to handle errors in corrupted repeating primitives during frame reception. In one embodiment, method 400 may be implemented as a process to determine whether the above conditions (1)-(4) are satisfied when an error condition is encountered, so that reception of a "good" frame may be indicated. In some embodiments, method 400 may be performed by frame validation circuitry 160, 160*a* as depicted in FIGS. 1 and 2. Furthermore, in other embodiments, method 400 may be performed by the receive processor 204 of frame validation circuitry 160*a* as depicted in FIG. 2.

Method 400 begins with decision block 405, where the receive processor determines whether a start of frame primitive has been received. If a start of frame primitive has not yet been received, the process reiteratively checks for this primitive until it is received 405. When a start of frame primitive is received, the FIS type and attributes are captured at processing block 410. Then, the data and non-repeating primitives of the FIS are processed at processing block 450. At decision block 455, the receive processor determines whether a repeating primitive is in the received transmission. If it is determined that there is not a repeating primitive, the process continues to decision block 460, which will be discussed below.

If there is a repeating primitive, the process continues to processing block 415, where the repeating primitive type, as well as the continue primitive associated with the repeating primitive, are captured. Next, the repeating primitive "junk" data is received at processing block 420. At decision block 425, the receive processor determines whether the "junk" data received is bad data (i.e., corrupted data). If it is bad "junk" data, then, at decision block 430, it is determined whether there have been three or less errors in the "junk" data so far.

In some embodiments, the threshold level of three or less errors may vary. This threshold is based on a SATA and/or SAS protocol with a Dword receive cycle. Under the SATA and SAS protocols, 8b/10b encoding is used for transmitting data. With 8b/10b encoding, clock recovery data for the receiver is encoded into the transmitted serial data. If there are 4 or more bad Dwords transmitted, then a receiver will be unable to recover the clock data from the data, and thereby lose synchronization with the transmitter. In other data transfer protocols, a different threshold level of errors may be appropriate. One skilled in the art will appreciate that embodiments of the invention are not necessarily limited to a threshold level of three or less errors.

If it is determined that the number of errors has exceeded the threshold level at decision block 430, then the process continues to processing block 445. At processing block 445, the frame is abbreviated and the errors are flagged for resolution by the frame validation circuitry.

However, if the threshold limit has not been reached, then the process returns to receiving the repeating primitive "junk" data at processing block 420. If the "junk" data is not bad at decision block 425, then it is determined at decision block 435 whether the "junk" data is good data. If the "junk" data is good data, then the process returns to processing block 420 to continue receiving the "junk" data. If it is not good "junk" data, then "junk" data is no longer being transmitted and the next primitive has been received. At decision block 440, it is determined whether the primitive is a good primitive. If the primitive is corrupt, then the frame is abbreviated and the error(s) is flagged at processing block 445.

If the primitive is good, then the process returns to processing block 450 where the data following the primitive and any other non-repeating primitives of the FIS are processed. At decision block 455, it is again determined whether a repeating primitive is encountered. If not, the process continues to decision block 460, where it is determined whether an end of frame primitive has been encountered. If an end of frame primitive has not been encountered, the process returns to processing block 450 to process data and non-repeating primitives. If an end of frame primitive is encountered, then, at processing block 465, CRC is performed, invalid SATA/SAS/STP sequences are flagged, and FIS lengths are determined. Finally, at processing block 470, the frame is formatted for a DMA to memory transfer, and the start of frame header and end of frame tailers are appended.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method, comprising:
   identifying a repeating primitive sequence followed by another primitive within a received frame, the repeating primitive sequence comprising repeated primitives of identical primitive type, the another primitive having a different respective primitive type from the identical primitive type, the another primitive indicating to a receiver of the received frame that data that is between the another primitive and a next succeeding primitive in the received frame is to be ignored by the receiver;
   determining whether the data that is between the another primitive and the next succeeding primitive includes one or more errors;
   if number of the one or more errors is less than a determined threshold, indicating a successful reception of the received frame despite the one or more errors; and
   if an error condition exists in the received frame, indicating, despite the existence of the error condition, that no error exists in the received frame if:
      integrity of frame information structure of the received frame is uncompromised by the error condition; and
      a primitive control character is uninvolved in the error condition.

2. The method of claim 1, further comprising intervening to attend to the one or more errors if the number of the one or more errors exceeds the determined threshold.

3. The method of claim 2, wherein the intervening further comprises:
   abbreviating the received frame; and
   flagging the one or more errors.

4. The method of claim 3, further comprising intervening to attend to the one or more errors if the one or more errors involve a corrupted primitive control character.

5. The method of claim 1, wherein the received frame is transmitted using at least one of a Serial Advanced Technology Attachment (SATA) and a Serial Attached Small Computer Systems Interface (SAS) protocol.

6. The method of claim 5, wherein the determined threshold is three errors.

7. The method of claim 1, wherein the one or more errors are at least one of invalid data characters, improper data synchronization, and invalid encoding.

8. An apparatus comprising:
   identification circuitry to identify a repeating primitive sequence followed by another primitive within a received frame, the repeating primitive sequence comprising repeated primitives of identical primitive type, the another primitive having a different respective primitive type from the identical primitive type, the another primitive indicating to a receiver of the received frame that data that is between the another primitive and a next succeeding primitive in the received frame is to be ignored by the receiver;
   error checking circuitry to determine whether the data that is between the another primitive and the next succeeding primitive includes one or more errors;
   processing circuitry to:
      process the received frame while ignoring the one or more errors if a number of the one or more errors is less than a determined threshold;
      process the received frame while attending to the one or more errors if the number of the one or more errors exceeds the determined threshold; and
      if an error condition exists in the received frame, indicate, despite the existence of the error condition, that no error exists in the received frame if:
         integrity of frame information structure of the received frame is uncompromised by the error condition; and
         a primitive control character is uninvolved in the error condition.

9. The apparatus of claim 8, wherein the received frame is received using at least one of a Serial Advanced Technology Attachment (SATA) and a Serial Attached Small Computer Systems Interface (SAS) protocol.

10. The apparatus of claim 9, wherein the determined threshold is three errors.

11. The apparatus of claim 8, wherein to process the received frame while ignoring the one or more errors further comprises indicating a successful reception of the received frame.

12. The apparatus of claim 11, wherein the attending to the one or more errors occurs if the one or more errors comprises a corrupted primitive control character.

13. A system, comprising:
   a storage device;
   and a host bus adapter (HBA), coupled to the storage device, having:
      frame validation circuitry to:
         identify a repeating primitive sequence followed by another primitive within a received frame, the repeating primitive sequence comprising repeated primitives of identical primitive type, the another primitive having a different respective primitive type from the identical primitive type, the another primitive indicating to a receiver of the received frame that data that is between the another primitive and a next succeeding primitive in the received frame is to be ignored by the receiver;
         determine whether the data that is between the another primitive and the next succeeding primitive includes one or more errors;
         if number of the one or more errors is less than a determined threshold, indicate a successful reception of the received frame despite the one or more errors; and
         if an error condition exists in the received frame, indicating, despite the existence of the error condition, that no error exists in the received frame if:
            integrity of frame information structure of the received frame is uncompromised by the error condition; and
            a primitive control character is uninvolved in the error condition.

14. The system of claim 13, wherein the frame validation circuitry further includes a receive processor to identify the repeating primitive sequence followed by the another primitive within the received frame, determine whether the data includes the one or more errors, and to indicate the successful reception of the received frame.

15. The system of claim 14, wherein the received frame is received using at least one of a Serial Advanced Technology Attachment (SATA) and a Serial Attached Small Computer Systems Interface (SAS) protocol.

16. The system of claim 13, wherein the determined threshold is three errors.

17. Machine-readable memory storing instructions that, when accessed by a machine, cause the machine to perform operations comprising:
   identifying a repeating primitive sequence followed by another primitive within a received frame, the repeating primitive sequence comprising repeated primitives of identical primitive type, the another primitive having a different respective primitive type from the identical primitive type, the another primitive indicating to a receiver of the received frame that data that is between the another primitive and a next succeeding primitive in the received frame is to be ignored by the receiver;
   determining whether the data that is between the another primitive and the next succeeding primitive includes one or more errors;
   processing the received frame while ignoring the one or more errors if the number of errors is less than a determined threshold; and
   if an error condition exists in the received frame, indicating, despite the existence of the error condition, that no error exists in the received frame if:
      integrity of frame information structure of the received frame is uncompromised by the error condition; and
      a primitive control character is uninvolved in the error condition.

18. The machine-readable memory of claim 17, wherein the operations further comprise intervening to attend to the one or more errors if the number of the one or more errors exceeds the determined threshold.

19. The machine-readable memory of claim 18, wherein the intervening further comprises:
   abbreviating the received frame; and
   flagging the one or more errors.

20. The machine-readable memory of claim 19, wherein the operations further comprise intervening to attend to the one or more errors if a primitive following the data is corrupted.

21. The machine-readable memory of claim 17, wherein the received frame is received using at least one of a Serial Advanced Technology Attachment (SATA) and a Serial Attached Small Computer Systems Interface (SAS) protocol.

22. The machine-readable memory of claim 21, wherein the determined threshold is three errors.

* * * * *